Nov. 29, 1938.   H. A. WEINLICH ET AL   2,138,649
REPEAT PRINTING OF ITEMS
Filed July 24, 1936   3 Sheets-Sheet 1

Nov. 29, 1938.  H. A. WEINLICH ET AL  2,138,649
REPEAT PRINTING OF ITEMS
Filed July 24, 1936   3 Sheets-Sheet 2

INVENTOR
Hermann A. Weinlich
Karl Heinrich Breinlinghe
BY
W. M. Wilson
ATTORNEY

| A・MACHINE CO. | | | | | | | |
|---|---|---|---|---|---|---|---|
| ORDER No. | PIECE No. | CUSTOMER No. | MONTH | DAY | YR. | | |
| 432 | 82 | 7462 | 4 | 2 | 36 | | 1 |
| | | EMPLOYEE No. | HRS. | RATE | AMOUNT | | |
| 432 | 82 | 26 | 2 | | 75 | 1 50 | 2 |
| 432 | 82 | 12 | 1 | | 50 | 50 | 3 |
| 432 | 82 | 8 | 3 | | 60 | 80 | 4 |
| 432 | 82 | 47 | 1 | 1 | 25 | 1 25 | 5 |
| 432 | 82 | 62 | 5 | 2 | 25 | 11 25 | 6 |
| 432 | 82 | 11 | 3 | | 60 | 1 80 | 7 |

INVENTOR
Hermann A. Weinlich
Karl Heinrich Breitinger
BY
W. M. Wilson
ATTORNEY

UNITED STATES PATENT OFFICE 2,138,649

REPEAT PRINTING OF ITEMS

Hermann A. Weinlich, Berlin-Wilmersdorf, and Karl Heinrich Breinlinger, Berlin-Grunewald, Germany, assignors to International Business Machines Corporation, New York, N. Y., a corporation of New York Application July 24, 1936, Serial No. 92,336
In Germany January 2, 1936

20 Claims. (Cl. 101—93)

This case relates to tabulating machines for printing data derived from record cards.

Each record card has parallel columns of index point positions perforated according to a selected code to designate desired data.

It may be desired to print different information related to a common subject on a record sheet or form. For instance in preparing wage records, the common subject may be the customer number, order number, the number of the piece ordered, the date for delivery, and so on. All this information concerning the common subject is punched into one record card, which may be referred to as the common card or the order card. The different information related to the common subject may be the different steps required to manufacture the piece. Each manufacturing step may have taken a certain number of hours, has a predetermined wage rate or wage per hour, and a total wage cost. All this information related to a single manufacturing step is punched into a record card. For each such step there is a different record card, which may be referred to as the individual or detail or wage card.

Each manufacturing step may be performed by any one of several workmen, and the steps required to make a particular piece may have been performed by different workmen. Thus, each detail card, in order that it be usable for different workmen, should not contain data restricting it to a particular workman. Further, each detail card should be usable for different orders and with different common cards. In order to use the detail cards with different common cards, the detail cards should also be without data restricting it to a particular order.

The machine is required to print a record of the wage cost of an order on a record form or record sheet. Each line of the printed record relates to a different step of manufacture. After the wage record has been printed on the form, each line of the form containing the data of a manufacturing step may be severed from the form and handed to the particular workman who carried out the step. The workman may take this line of the form, which may be referred to as a detail record slip, to the pay office, and be paid there the amount recorded on the slip.

It is desirable that each such detail slip be properly identifiable with relation to the common subject or job. This may be done by printing on each line of the form, later to be detached as a detail slip, classifying data such as the order number and piece number for which the manufacturing step was performed. Since the detail cards do not bear information relative to the common subject, it is necessary to print the order and piece numbers on each line of the record form independently of the detail cards.

Accordingly, an object of the invention is to set up means for effecting printing of classifying data alongside each of a plurality of lines of information independently of the record cards which contain the latter information.

An object is further to effect a set-up of the classifying data once and to then cause repeated printing of this data according to the set-up.

Still further, an object is to effect the classifying set up under control of the common card.

Further, the object is to disable the set-up repeat printing means after all the detail lines of information on the record form have been printed.

The common card and the detail cards related thereto are arranged in one group and when this group has passed through the machine, the usual total print and reset cycle takes place.

Another object is to provide means effective during the reset cycle for disabling the repeat print means.

Other objects will appear from the following parts of the specification and from the drawings.

The invention has been applied, for purposes of the disclosure, to the machine disclosed in Patent No. 1,762,145, but may be equally well used with any other suitable tabulating machine.

Figure 4:
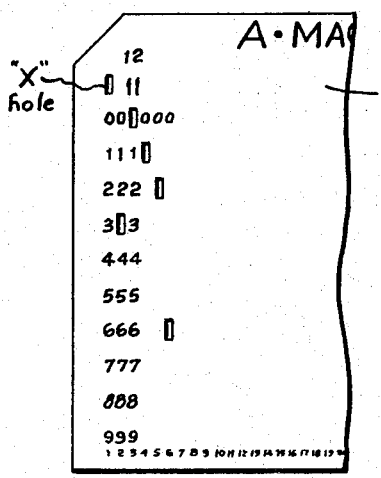
Fig. 4 shows part of a tabulating or record card.

As indicated in Fig. 4, the record card has value positions 9 to 0 reading upwardly and a special 11 position, commonly called the X position, which is above the 0 position. A perforation in any of positions 9 to 0 represents the value corresponding to the perforated position. The cards are fed bottom first so that the positions are read in the order 9, 8—0, 11. The interval of a machine cycle during which the 9 to 0 positions pass through the machine may be called the item period.

The cards related to a common subject, as to a production job on an order, are grouped together, with the common or order card placed first in the group. In addition to the common card bearing the customer, order, and piece number data, it also has a special perforation in a selected column, preferably in the X position of the column. This special perforation may be referred to as the X hole.

Assume a single group of cards T from which a record is to be made has been placed in the supply hopper 10. After a series of preliminary starting operations, the following circuit is formed (Fig. 1):

Tabulating cycle circuit

From the right side of the supply, through upper, closed, cam contacts P—3, contacts Y—2 (closed for listing), cam contacts L—6, relay contacts 11a, relay 11, tabulating clutch magnet 14, magnet 15, binding post 16, post 17, contacts Y—1 (closed for listing), post 18, shunt field 19 of the tabulating motor TM, and to the left side of the supply.

At the same time, a branch circuit is formed which begins as in above circuit and branches off from binding post 16 through resistance 20, the armature of motor TM, the series field 21, and to the left side of the supply.

When cam contacts L6 open near the end of a tabulating cycle, the motor TM and tabulating clutch magnet 14 are held energized by shunting cam contacts L6 and list contacts Y—2, through a shunt path comprising stop key contacts SP, relay contacts 23a of motor control relay 23, and upper card lever contacts UCL'.

The upper card lever contacts are closed until the cards are exhausted. When the last card passes the upper card lever, contacts UCL' open. The upper card lever contacts are shunted by cam contacts C—3 which maintain motor TM and magnet 14 energized after the upper card lever contacts open until cam contacts L—6 close during the tabulating cycle following the opening of the upper card lever contacts. Magnet 14 and motor TM remain operative until cam contacts L—6 open. Then, with contacts L—6, C—3, and UCL' open, the tabulating motor and clutch are deenergized and the tabulating cycles cease.

When the tabulating clutch magnet 14 is deenergized, it permits a switch 14' to close. This occurs during the last tabulating cycle when cam contacts L—6 open. Cam contacts L—1 then close to establish the following circuit:

Reset cycle circuit

From the right side of the line, through upper contacts P—3, contacts SP, auto reset switch 24, cam contacts L—1, contacts 14', reset clutch magnet 25, reset motor RM, and to the left side of the supply.

The reset motor and clutch magnet are retained in operation for one total print and reset cycle by shunt circuits through reset cycle contacts P—1 and through contacts 25' (closed by energization of magnet 25), and cam contacts L—2.

During tabulating cycles, cards are fed through upper and lower card analyzers, respectively including upper sensing brushes UB and lower sensing brushes LB. The card passing through the upper analyzer keeps card lever contacts UCL' closed for the cycle. During the next tabulating cycle, the card passes through the lower analyzer. While a card is passing through the lower analyzer, its data is read out into accumulating and printing mechanisms. The machine has several banks of accumulating and printing devices. Each bank may receive entries under control of different card columns. For this purpose, the contact plates 26 which coact with the lower brushes LB and each of which is related to a different card column are connected to plug sockets 28. Plug connections may be made from any of sockets 28 to any of the plug sockets 30 of the different accumulator and print banks. Thus, if a multi-denominational item from columns 16 to 20 is to be entered into bank #1, the plug sockets 28 connected to the contact plates 26 which sense card columns 16 to 20 are plugged to the four lower order sockets 30 of bank #1.

A representative entry circuit is formed as follows when a lower brush senses a perforation in one of positions 9 to 0 of a card column.

Card item entry circuit

From the right side of the line, through upper cam contacts P—3, contact Y—2, contacts L—6, lower card lever contacts LCL' (closed by the card as it passes through the lower analyzer), binder post 31, wire 32, lead 33, cam contacts T—4, T—5, line 34, common bar 35 of the lower analyzer, the brush LB sensing the perforation, the contact plate 26 engaging brush LB through the perforation, plug socket 28, a plug connection (not shown) to plug socket 30, control magnet 36, contacts 36a, and line 37 to the left side of the supply.

Energization of control magnet 36 opens contacts 36a and closes contacts 36b to form the following circuit:

Print magnet list circuit

From the left side of the line, through contacts 36b, print magnet 38, bus bar 39, line 40, switch 41 (closed for listing), list print cam contacts LP, upper cam contacts P2, line 42, brush 43 (now off insulation 44 due to rotation of commutator 45 during listing tabulating cycles), the contact portion of commutator 45, brush 46, wire 32, terminal 31, lower card lever contacts LCL', contacts L—6, Y—2, and upper P—3 contacts to the right side of the supply.

Figures 3, 5:
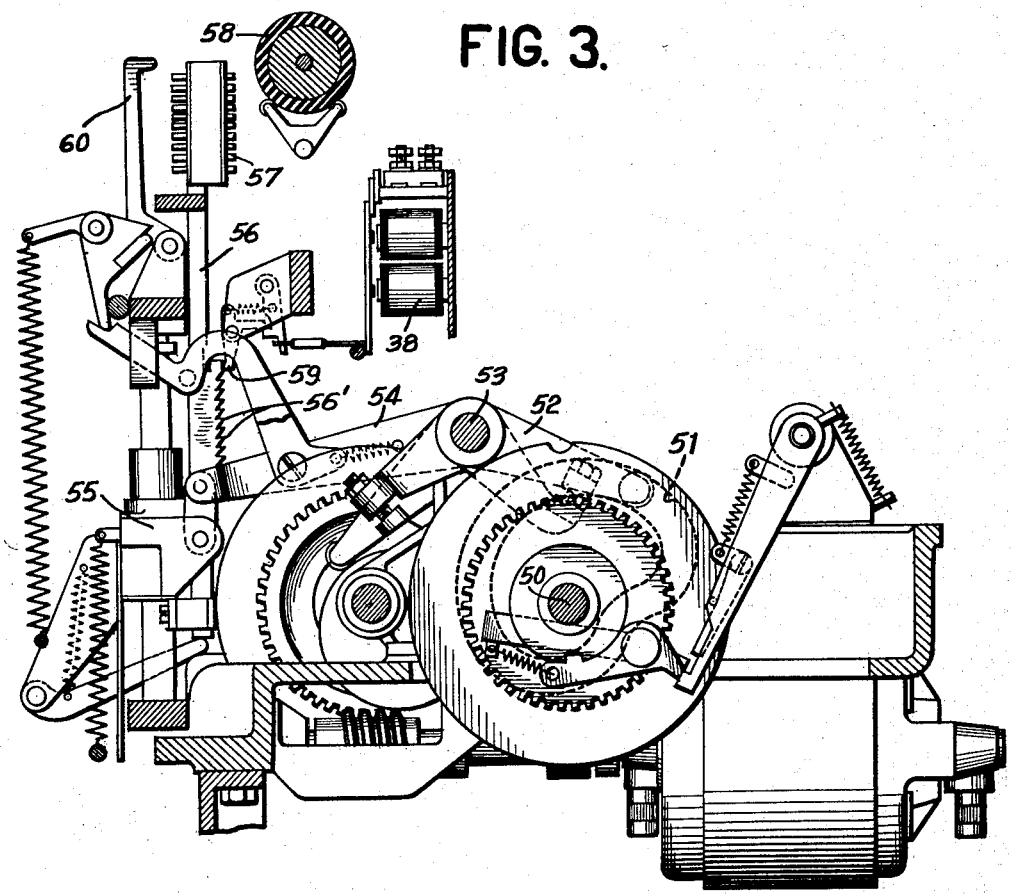
Fig. 3 shows one order of the printing means.
Fig. 5 is an example of a record printed by the machine.

The print magnet list circuit controls printing mechanism for printing the item, analysis of which formed the circuit. One order of the print means is shown in Fig. 3. Shaft 50 is driven by the tabulating motor TM, and during listing cycles rotates box cam 51 to rock an arm 52 and its shaft 53 clockwise (Fig. 3). Shaft 53 rigidly carries an arm 54 connected to the cross head 55, which through yieldable connections supports the type carriers 56. The upper parts of type carriers 56 mount the type 57 for transverse movement towards platen 58. Each type carrier 56 has on its front edge a series of notches 56' adapted to be engaged by a dog 59. When a print magnet 38 is energized, it releases the associated dog 59 to stop type carrier 56 with the type 57 corresponding to the analyzed item in printing position opposite the platen. After the item period of the cycle, that is, after the 9 to 0 index points of a card column pass the analyzing means, a hammer 60 is released to strike the type 57 at printing position and effect printing on the record sheet wrapped around the platen.

The sheet is fed one line after each printing operation, so that successive listing is effected on successive lines of the sheet. For further details of the printing and sheet feeding mechanism, recourse may be had to the aforementioned Patent 1,762,145.

During the first tabulating cycle on a group of cards, the first card passing through the lower analyzer is the common or order card, bearing the customer, order, and piece designations. As the index positions 9 to 0 of the common card pass the lower brushes LB, the card entry circuits are formed to in turn cause the list printing circuits to be completed. The printing circuits cause the data on the order card to be printed in line 1 of the sheet (Fig. 5).

The order and piece numbers are to be printed on the successive following lines of the sheet, alongside each production or wage item. The latter items are recorded on the detail or wage cards which do not contain the order and piece numbers. Only the first card, the order card, bears the order and piece numbers. In order to provide for repeat printing of the order and piece numbers during the printing of the detail items, the following means are provided.

Figure 2:
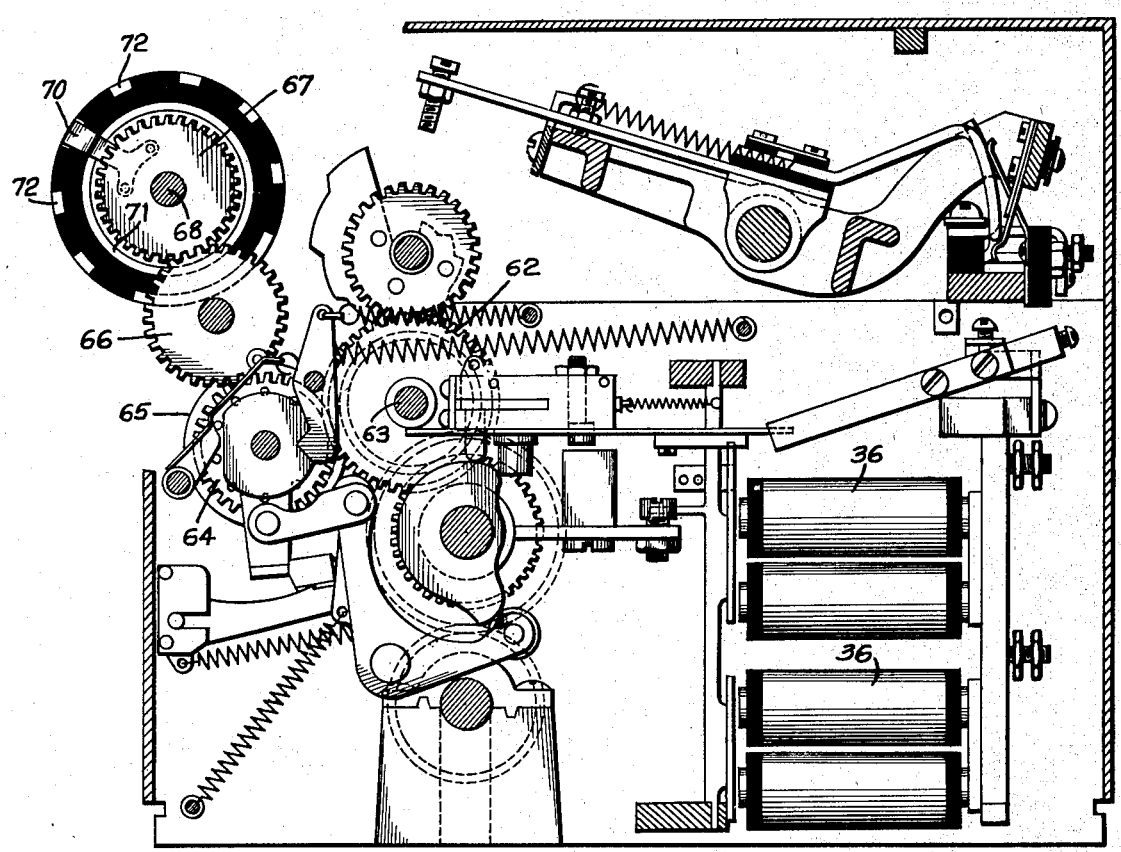
Fig. 2 shows one order of the read-out commutator comprising type selecting apparatus.

The repeat printing control means include electrical value read-out mechanism such as disclosed in Patent 1,896,561. One order of the read-out means is shown in Fig. 2. When a perforation 9 to 0 in a card is sensed by the lower analyzer, an entry circuit is formed to energize a control magnet 36.

Referring to Fig. 2, energization of a magnet 36 couples a gear 62 to a shaft 63 driven by the tabulating motor. The gear 63 drives gear 64 of an indicating wheel 65. In turn, gear 64, through an idler 66, rotates gear 67 rotatably mounted on a shaft 68. Gear 67, through insulation, carries a feeler 70, one portion of which engages a contact ring 71 and the outer portion of which is engageable with any of ten contact segments 72. Contact segments 72 are insulated from each other and from contact ring 71 and correspond to values 0 to 9. When a control magnet 36 is energized upon analysis of a value designation by the lower analyzer, the magnet couples gear 62 to shaft 63 for differential rotation thereby equivalent to the value of the sensed designation. Through the described gear, differential rotation of shaft 63 enters the analyzed value into indicating wheel 65 and simultaneously sets feeler 70 into engagement with the segment 72 corresponding to the analyzed value.

Figure 1:
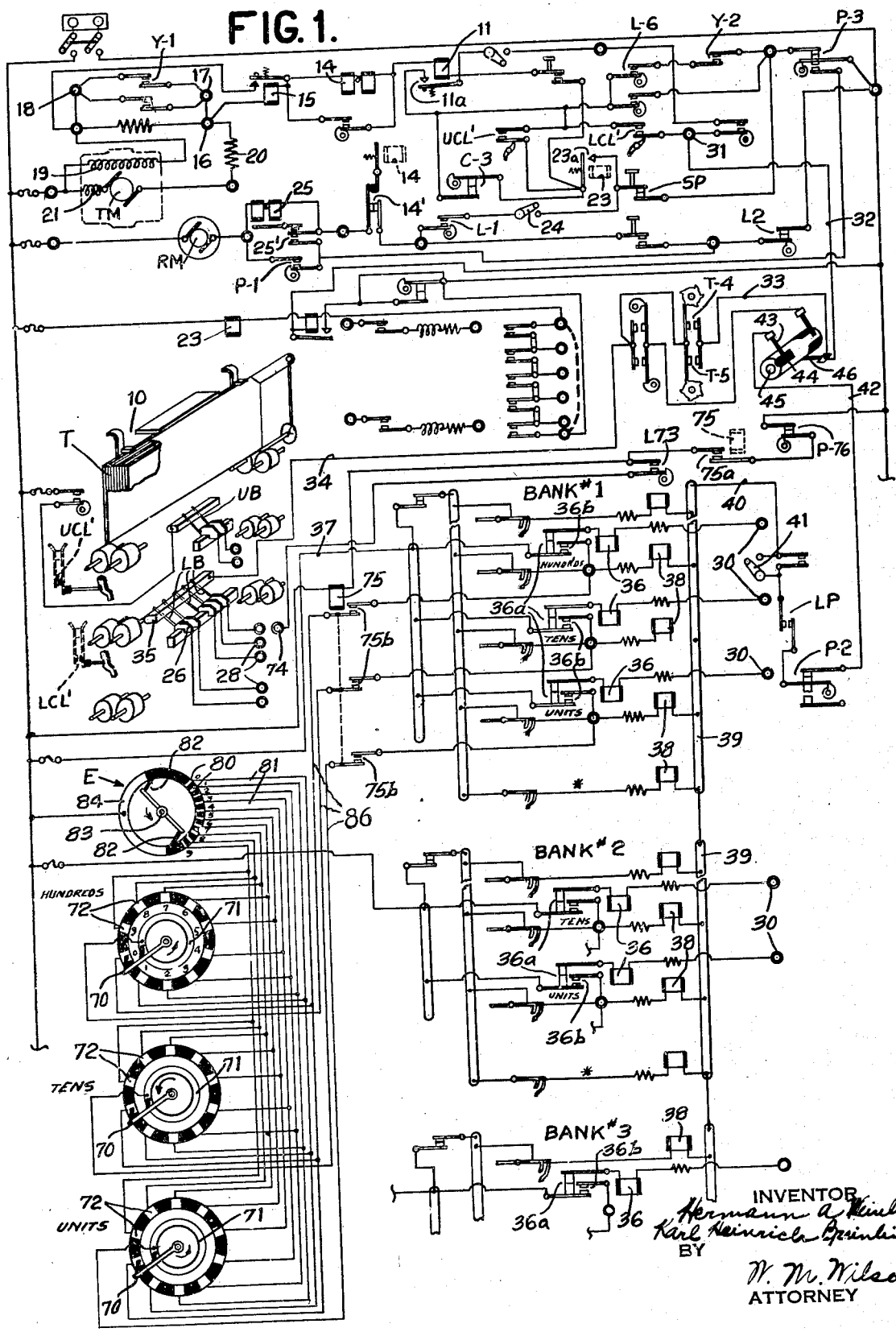
Fig. 1 is the circuit diagram.

Each print and add bank may include such read-out means. Where a bank is provided with the read-out means, it is understood that there is one read-out commutator order for each order of the print and add bank. Fig. 1, for the sake of the disclosure, illustrates three orders of read-out commutators. These commutators, in the present example, are the ones set under control of corresponding orders of control magnets 36 of bank #1.

During the first tabulating cycle on a group of cards, the first card, which is the order card, feeds past the lower analyzer. The order card bears the customer, order and piece numbers. As the order card passes through the lower analyzer, the entry circuits are formed to energize control magnets 36, which, in turn, cause energization of print magnets 38. The latter cause the data taken from the order card to be printed in line 1 of the record sheet (Fig. 5). In the present case, the lower analyzer elements which sense the order number columns are connected through plug sockets 28 and 30 to bank #1. Hence, as the order number is sensed by the lower analyzer, control magnets 36 of bank #1 are energized to set the read-out commutators of bank #1 according to the order number. At the same time, print magnets 38 of bank #1 are energized to correspondingly control the printing elements of bank #1. All this takes place as the 9 to 0 positions of the order card pass the lower brushes. As stated before, the order card also has an "11" or X hole perforation in a selected column.

The passage of the "11" hole through the lower analyzer coincides with the closure of cam contacts L73 (controlled by the tabulating motor). When the "11" or X hole is sensed, a circuit is formed as follows:

*Circuit of relay 75.*—From the right side of the line, then as in the item entry control circuit to the contact plate 26 of the card column containing the X hole, to socket 28 of this contact plate, then through a plug connection to special plug socket 74, through cam contacts L73, relay 75, and to the left side of the line.

Energization of relay 75 closes contacts 75a to form a stick circuit, by-passing the lower analyzer and cam contacts L73 and extending through contacts 75a, closed reset cycle contacts P—76, and to the right side of the line.

Energization of relay 75 also closes parallel relay contacts 75b.

Thus, by the end of the first tabulating cycle, and as a result of the analysis of the order card, the order, piece, customer, and other data derived from the order card has been printed in line 1 of the sheet (Fig. 5). At the same time, commutators 70—71—72 of bank #1 have been set according to the order number, and relay contacts 75b of bank #1 closed.

In a similar manner, the read-out commutators of bank #2 or any other bank may have been set according to the piece number, and the contacts 75b of the bank closed.

During the second and subsequent tabulating cycles, the detail or production cards are passing through the lower analyzer; the detail card items are analyzed to cause energization of the print magnets 38 of the banks connected to the lower analyzing means for the detail item columns; and the detail items are printed in lines 2, 3, etc. of the record sheet (Fig. 5). For instance, where banks #1 and 2 are controlled by the order and piece number columns, the other banks may be controlled for printing the detail card items.

At the same time as the printing of the detail items takes place during the second and subsequent tabulating cycles, the order and piece numbers are printed. To effect this, print magnets 38 of the banks for printing the order and piece numbers are energized under control of the read-out commutators. Considering only the order number according to which the read-out commutators of bank #1 were set during the first tabulating cycle, the energization of the print magnets of bank #1 is effected as follows:

An emitter E (Fig. 1) is provided which has contact spots 80 of the same number and corresponding in value to the segments 72 of the read out commutators. The like value segments 72 of all the read-out commutators are commonly connected through a lead 81 to the corresponding value emitter spot 80. For instance, all the "8" segments 72 of the different commutators are connected to one lead 81 which is connected to the "8" spot 80 of emitter E.

Emitter E includes brushes 82 mounted diametrically opposite each other on a shaft 83 which is driven by the tabulating motor. During each listing or tabulating cycle, one brush 82 wipes along common contact segment 84 of the emitter while the other brush 82 successively engages the 9 to 0 spots 80 concurrently with the passage of the 9 to 0 index positions of a card past an analyzing brush and concurrently with the movement of the 9 to 0 type 57 past the printing position. During the second and subsequent tabulating cycles, emitter E coacts with the read-out commutators to sense the values standing thereon just as the analyzing means senses the values on the cards. Assuming the units order commutator of bank #1 to be set at value "7", then as the "7" type 57 reaches printing position, the "7" spot 80 will be engaging a brush 82 and the following circuit will be formed to energize units order print magnet 38 of bank #1.

*Read-out circuit.*—From the left side of the supply, through common contact segment 84, brushes 82, the "7" contact spot 80, the connected lead 81 to the "7" segment 72 of the units order commutator, the feeler 70 of the latter commutator, the contact ring 71 thereof, conductor 86, units order contacts 75b (now closed), units order print magnet 38, bus bar 39, line 40, and as before in the print magnet list circuit.

The read-out circuit energizes magnet 38 to position the units order printing means of bank #1 for printing the order number. This read-out circuit is formed during the second and subsequent tabulating cycles, during which the successive detail cards are passing the lower analyzer. Hence, the repeated printing of the order number during the second and following tabulating cycles accompanies the printing of the detail card items. In this manner, each line of the record form shown in Fig. 5 includes the order number record as well as the detail item record.

Similarly, the read-out commutators of bank #2 may control repeat printing of the piece number for each detail item printed.

When the last detail card of the group passes the upper analyzer, upper card lever contacts UCL' open. Then intermediate the next tabulating cycle, when the last detail card is passing through the lower analyzer, cam contacts C—3 open. Near the end of the latter cycle, cam contacts L—6 open. As explained before, with contacts UCL', C—3, and L—6 open, the tabulating motor stops, the tabulating clutch magnet 14 is deenergized, and a reset cycle is initiated.

The reset cycle mechanism opens cam contacts P—76 to break the holding circuit of relay 75, as a result of which contacts 75a and b open. During the reset cycle, the indicating wheels 65 are restored to zero positions and correspondingly the feelers 70 of the read-out commutators are reset to zero positions. For further details of the reset cycle means and the resetting operation, recourse may be had to Patents 1,762,145 and 1,822,594.

At the end of the reset cycle, the parts are in initial position ready for operation on a new group of cards.

The operation is believed clear from the above description. In the claims, the read-out commutators 70—71—72 may be referred to as type selecting means. Further, the latter term may also be applied to the commutators together with the means for setting them. The emitter E and the read-out commutators may be referred to as repeat printing-effecting means. The latter may also include the relay 75 and contacts 75b. Relay 75, contacts 75b, and the control means of relay 75 may be referred to as means for conditioning the machine for repeat printing or for rendering the repeat print means effective. Other suitable terms may also be used to define the parts of the invention.

It is also understood that the invention is not limited to the specific embodiment shown herein but may be embodied in different forms, and that variations, departures, and changes from the form illustrated herein may be made without departing from the purview of the invention. It is therefore desired to be limited in accordance with the following claims.

What is claimed is:

1. In a machine operating cyclically on item bearing record cards passing through the machine successively, one each cycle; the combination of printing means including type elements, a type selector for selecting the type elements for printing, card-controlled means to set the selector a single time according to a selected card item, automatic repeat control means, including means operated recurrently, once during each cycle of passage of a card, for automatically effecting repeated selection of the type elements by the selector, once during each such cycle, according to the single setting of the latter, and means to automatically initiate cancellation of the setting of the selector after a plurality of repeat selections have been effected.

2. In a machine operating cyclically on item bearing record cards passing through the machine successively, one each cycle; the combination of recording means including selectively operable elements, a selecting device to select the elements for operation, card-controlled means for setting the selecting device once according to a selected card item, automatic repeat control means, including means operating recurrently, once during each cycle of passage of a card, for automatically effecting repeated selection of said elements, once during each such cycle, by the selecting device in accordance with the single setting of the latter, and means to automatically initiate cancellation of the setting of the selecting device after a plurality of repeat selections have been effected.

3. In a machine operating cyclically on item bearing record cards and having means to record individual items of the cards, of one card after another, during successive cycles; the combination of recording elements, means to effect recording operation by said elements and said recording means during the same cycle, a selecting device to select the elements for recording operation, card-controlled means for setting the selecting device once according to a selected classifying card item, instrumentalities cooperating with the selecting device to effect repeated selection of the recording elements, once during each such cycle, to cause said elements to record the classifying item according to the single setting of the selecting device, alongside the record of individual items of each card made by said recording means during each of the same cycles, and means to automatically initiate cancellation of the setting of the selecting device after a plurality of repeat selections have been effected.

4. In a machine operating on record cards bearing item designations; the combination of recording elements, a selecting device to select the elements for recording operation, card-controlled means to condition the selecting device according to a selected card item, and means controlled by a special designation on a card for selectively controlling the effectivity of the selecting device, subsequent to the item conditioning of the latter, in selecting the recording elements for recording said card item.

5. In a machine operating on record cards bearing item designations; the combination of recording elements, a selecting device to select the elements for recording operation, means controlled by a card for conditioning the selecting device according to an item designated on the card, and means controlled by a special designation on the latter card for selectively controlling the effectivity of the selecting device, subsequent to the item conditioning of the latter, in selecting the recording elements for recording said item.

6. In a machine cyclically operating on a group of related item bearing record cards passing through the machine in succession, one card each cycle; the combination of recording elements, selecting apparatus to select the elements for recording operation, card-controlled means for setting the selecting apparatus once according to a selected card item, instrumentalities for rendering the selecting apparatus effective to select the recording elements repeatedly, once during each cycle of card passage, and in accordance with the single setting of the selecting apparatus, means for effecting recording by the elements during each cycle and upon each selection thereof, and means to automatically initiate cancellation of the setting of the apparatus after passage of the last card of the group.

7. In a machine cyclically operating through which are passed, in successive cycles, item bearing record cards of a common group, one of the cards being a classifying card bearing a group classifying item; the combination of printing mechanism, apparatus to control the printing mechanism for printing a selected item, means controlled by the classifying card for conditioning the aforesaid apparatus according to the classifying item, and instrumentalities, including means rendered effective by a characteristic of the classifying card, for cooperatively relating the apparatus to the printing mechanism to control the printing mechanism by aforesaid apparatus for printing the classifying item repeatedly, once during each cycle of passage of each card following the classifying card.

8. In a machine through which are passed in succession item bearing record cards of a common group led by a classifying card bearing a group classifying item; the combination of item printing means, means to select the printing means for printing operation, means controlled by the one classifying card as it passes through the machine for setting the selecting means once according to the classifying item, automatic repeat printing control means for rendering the selecting means effective as each card of the group following the classifying card passes through the machine for repeatedly selecting the printing means for operation according to the single setting of the selecting means, and mechanism for effecting printing of the classifying item by the printing means upon each selection of the latter.

9. In a machine through which are passed in succession item bearing detail cards of a common group led by a classifying card bearing a group classifying item and a special designation; the combination of printing means, apparatus to select the printing means for operation, means controlled by the classifying card as it passes through the machine for reading the classifying item into the selecting apparatus, means controlled by the special designation on the card for rendering the selecting apparatus effective to have the classifying item read out therefrom, and a device repeatedly operated, once during the passage of each card following the classifying card, for reading out the classifying item from the selecting device and into the printing means to thereby effect repeated printing by the latter of the classifying item, once for each detail card.

10. In a cyclically operating machine through which are passed, in successive cycles, item bearing detail cards of a common group preceded by a classifying card having a group classifying item; the combination of recording means, apparatus controlled by the one classifying card according to the classifying item for selecting the recording means to record the classifying item, and electrical means repeatedly operative, once during each cycle of passage of each detail card following the classifying card, to coact with said apparatus for electrically controlling, independently of any items on the detail cards, the recording means to repeat the recording of the classifying item once for each passage of each detail card.

11. In a cyclically operating machine through which are passed, in successive cycles, detail cards of a common group led by a classifying card bearing a group classifying item; the combination of printing means, selecting apparatus, means controlled by the one classifying card for setting up the selecting apparatus according to the classifying item, a device operative repeatedly, once during each cycle of passage of each detail card, for causing the selecting apparatus to control the printing means to print the classifying item repeatedly, once for each detail card passing through the machine after the classifying card, and means automatically operative upon passage of the last detail card of the group for interrupting operation of the aforesaid device and cancelling the set up of the selecting apparatus.

12. In a machine through which a group of item bearing record cards is passed; the combination of control devices, printing means controlled by said devices to print an item, selecting apparatus for the control devices, card-controlled means for setting the apparatus according to a card item, card-controlled means for connecting the selecting apparatus to the control devices to select the latter for operation according to the setting of the apparatus, means for maintaining said connections in effect during passage of successive cards of the group, instrumentalities coacting with said apparatus and said connections to cause said devices to repeatedly control the printing means to print the aforesaid card item repeatedly, once for each card of the group following the special card, and means operative upon the last card of the group passing through the machine for disconnecting the selecting apparatus from the control devices.

13. In a cyclically operating machine operating on item bearing record cards in succession, on one card each cycle; the combination of printing means including type elements, type selecting means including type selecting circuits, means controlled by a special card for selecting the circuits for operation according to an item on the special card, card-controlled means operative following the selection of the circuits for partially closing the circuits, a cyclically operative device for repeatedly completing the partially closed selected circuits to effect repeated selections of the type elements once each cycle of the machine, and means for causing the selected type elements to effect printing of the special card item upon each selection of the type elements.

14. In a cyclically operating machine operating during successive card cycles on item bearing record cards; the combination of printing mechanism, means for controlling the printing mechanism for printing selected items, said controlling means including selecting circuits, a commutator for selecting the circuits for operation, means controlled by a special card for setting the commutator, according to a special card item, to select one of the circuits for operation, means conditioned by the special card for partially closing the selected circuit, and a cyclically operative device operative once each card cycle to complete the partially closed selected circuit to thereby cause repeated selection of the printing means, once each cycle, to print the special card item.

15. In a cyclically operating machine through which item bearing record cards pass through in succession, one card each cycle; the combination of printnig means, magnets to control the printing means for printing operation, circuits for the magnets, means controlled by a record card according to an item therein for selecting the circuits for operation, and an emitter having repeat operations, repeating during each cycle of card passage, for closing the selected circuits recurrently to energize the related magnets repeatedly to control the printing means according to the card item during each said cycle.

16. In a cyclical machine operating in successive cycles on record cards while the latter are in motion; recording means comprising a selectively settable device, card-controlled means for setting the device stationarily a single time in accordance with a card item, means automatically and recurrently operating each said cycle, in synchronism with the movement of the card during each such cycle, for cooperating with the device according to its stationary, single setting for causing the recording means to repeatedly record the card item, and means to automatically initiate and effect cancellation of the setting of the device after the recording means has recorded the item a plurality of times.

17. In a machine operating during successive card cycles on a group of record cards; a commutator for storing items, means for reading an item from the first of the cards into the commutator, and cyclically opertaing means recurrently cooperatiang with the commutator, once during each card cycle, to repeatedly read out the item from the commutator in conjunction with the operation of the machine on each of the cards following the first card.

18. In a machine operating on record cards; the combination of item storing means to store a selected item, read out means including cyclically operable means recurrently operating with the storing means to read out the item therefrom once each cycle, and means controlled by a special characteristic of a card for determining the effectivity of the read out means.

19. In a machine operating on record cards; the combination of item storing means, card-controlled means for reading an item into the storing means, read out means including cyclically operable means recurrently cooperating with the storing means to read out the item therefrom once each cycle, and means controlled by a special characteristic of a card for determining effectivity of the read out means.

20. In a machine operating on successive record cards; the combination of item storing means, means for reading an item from a special card into the storing means, read out means including cyclically operable means recurrently cooperating with the storing means to read out the item therefrom once each cycle during operation of the machine on each of the cards following the special card, and means controlled by a special characteristic of the special card for determining the effectivity of the read out means.

HERMANN A. WEINLICH.
KARL HEINRICH BREINLINGER.